United States Patent
Boger

(10) Patent No.: US 7,818,093 B2
(45) Date of Patent: Oct. 19, 2010

(54) CONTROLLING FLUID REGULATION

(75) Inventor: Henry W. Boger, Foxboro, MA (US)

(73) Assignee: Dresser, Inc., Addison, TX (US)

( * ) Notice: Subject to any disclaimer, the term of this patent is extended or adjusted under 35 U.S.C. 154(b) by 695 days.

(21) Appl. No.: 11/741,681

(22) Filed: Apr. 27, 2007

(65) Prior Publication Data

US 2008/0269951 A1    Oct. 30, 2008

(51) Int. Cl.
  G05B 11/01    (2006.01)
  G05B 13/02    (2006.01)
  G05B 15/00    (2006.01)
  G01M 1/38    (2006.01)
  G05D 7/00    (2006.01)
  G05D 16/00    (2006.01)
  G05D 23/00    (2006.01)

(52) U.S. Cl. .................. 700/282; 700/19; 700/20; 700/40; 700/54; 700/71; 700/75; 700/275; 700/299; 700/301

(58) Field of Classification Search .......... 700/282, 700/19, 20, 40, 54, 71, 75, 275, 299, 301
  See application file for complete search history.

(56) References Cited

U.S. PATENT DOCUMENTS

| | | | |
|---|---|---|---|
| 5,954,089 A * | 9/1999 | Seymour | 137/487.5 |
| 6,691,435 B1 | 2/2004 | Schultz et al. | |
| 6,903,659 B2 * | 6/2005 | Vanderah et al. | 340/636.1 |
| 6,917,858 B2 | 7/2005 | Boger | |
| 7,058,542 B2 | 6/2006 | Hauhia et al. | |
| 2005/0109395 A1 | 5/2005 | Seberger | |
| 2005/0187515 A1 | 8/2005 | Varrichio et al. | |
| 2005/0222772 A1 | 10/2005 | Koederitz et al. | |
| 2005/0276233 A1 | 12/2005 | Shepard et al. | |
| 2006/0092039 A1 | 5/2006 | Saito et al. | |
| 2006/0148410 A1 | 7/2006 | Nelson et al. | |
| 2006/0220844 A1 | 10/2006 | Flanders | |

OTHER PUBLICATIONS

Piezoelectric Direct Drive Servovalve; Jason E Lindler et al.; 10 pages; Mar. 2000.*
International Search Report and Written Opinion of the International Searching Authority for PCT/US2008/061568, Oct. 21, 2009, 13 pages.

(Continued)

*Primary Examiner*—Ronald D Hartman, Jr.
(74) *Attorney, Agent, or Firm*—Fish & Richardson P.C.

(57) ABSTRACT

Fluid regulation control may be accomplished by a variety of systems, devices, and techniques. In one application, a fluid regulation control device may include a processor, a fluid control assembly, and a power source. The processor may be adapted to generate a command for controlling a fluid regulator and to adjust a power condition of the device, which may include a low power mode and a high power mode. The device may consume substantially less power in the low power mode than in the high power mode. The fluid control assembly may include a transducer, which may receive a control fluid and adjust it in response to the command during the high power mode. The fluid control assembly may also maintain the adjusted control fluid at a substantially constant value during the low power mode.

31 Claims, 6 Drawing Sheets

OTHER PUBLICATIONS

International Preliminary Report on Patentability (Chapter I of the Patent Cooperation Treaty) for PCT/US2008/061568, Nov. 5, 2009, 8 pages.

Honeywell, "*Wireless Pressure Transmitter User Manual*," 900 MHz ISM Band, XYR 5000 Line, 34-XY-25-01, Rev. 5, Aug. 2006, 42 pages.

Honeywell, "*Wireless Gauge and Absolute Pressure Transmitters*," Product Specification and Model Selection Guide, XYR 5000, WG510/WA510, 34-XY-01-01, Mar. 2005, pp. 1-5.

Asco Joucomatic Numatics, "*Piezo Valve Operator for Intrinsically Safe Areas*," Dec. 7, 2001, 2 pages.

Mintchell, Gary, "*Watch Out—Here it Comes*," Jan. 2007, 1 page.

* cited by examiner

US 7,818,093 B2

CONTROLLING FLUID REGULATION

TECHNICAL FIELD

This description relates to fluid regulation, and more particularly to systems and techniques to control fluid regulation.

BACKGROUND

Fluid regulation occurs in a variety of industries and for a variety of purposes. Often, industrial or commercial processes utilize fluid regulation in order to, for example, heat, cool, mix, or otherwise act upon a process or working fluid. One device used for regulating fluid in these processes may be a valve, for example, a process valve. Process valves may come in a variety of forms, such as globe valves, butterfly valves, or ball valves, to name only a few. In many instances, the process valve may be positioned by an actuator, which may be manually, electronically, or pneumatically operated. Process valves utilizing pneumatic actuators may utilize a fluid, such as a gas (e.g., air), to control the actuator.

A controller may often be used to send and receive signals in order to control the actuator, and hence, the position of the process valve. A signal may be sent to the controller instructing it to open or close the process valve as required. Often, that signal is sent through a set of wires or a conduit physically connected to the controller. Moreover, the controller may derive power from the set of wires. However, process valves may often be located such that the installation of wires to the controller is inconvenient, or worse, physically unfeasible. For example, process valves located outdoors or in hazardous working areas may not allow for the practical installation of wires to the controller, or also, wires or conduit to the process valve actuator. Further, cost concerns may render a wired controller impractical. Therefore, some process valve controllers may receive signals wirelessly. Regardless of the method a process valve controller uses to receive signals, the process valve actuator should be controlled so as to regulate fluid through the process valve for the particular process.

SUMMARY

This description relates to fluid regulation, and more particularly to systems, devices, and techniques to control fluid regulation.

In one general aspect, a device for fluid regulation control may include a processor, a fluid control assembly, and a power source. The processor may be adapted to generate a command for controlling a fluid regulator and to adjust a power condition of the device. The power condition may include a low power mode and a high power mode, and the device may consume substantially less power during the low power mode than during the high power mode. The fluid control assembly may include an electric-to-pressure transducer. The transducer may receive a control fluid and adjust the control fluid in response to the command from the processor during the high power mode. The control fluid may, for example, be air. The fluid control assembly may be operable to maintain the adjusted control fluid at a substantially constant value during the low power mode. The power source may be operable to supply power to the processor and the fluid control assembly. The power source may, for example, be a battery.

In particular specific aspects, the fluid control assembly may maintain the adjusted control fluid at the substantially constant value during the low power mode without receiving the command from the processor during the lower power mode. In some aspects, the fluid control assembly may include a valve. The valve may pass the adjusted control fluid during the high power mode and maintain a value of the adjusted control fluid during the low power mode. The fluid control assembly may also include a relay. The relay may be coupled between the transducer and the valve and may be adapted to receive the adjusted control fluid and further adjust the control fluid before conveying it to the valve. The relay may also be coupled to the valve and may be adapted to receive the adjusted control fluid from the valve and further adjust the control fluid. The valve may, for example, be a piezoelectric valve.

The processor may be adapted to consume substantially less power during the low power mode. In certain aspects, the processor may consume substantially no power in the low power mode.

In some aspects, the device may also include a transceiver. The transceiver may be coupled to the processor and the power source and may wirelessly communicate fluid regulation control information between at least one of a network, a central control facility, or a process transmitter. The transceiver also may consume substantially less power during the low power mode than during the high power mode. The fluid regulation control information may include a process transmitter measurement value, which may include a pressure value, a temperature value, or a flow value.

In certain specific aspects, the processor may transition the device from the low power mode to the high power mode upon receipt of fluid regulation control information and may send a command to the fluid control assembly in relation to the fluid regulation control information. The processor may also transition the device from the low power mode to the high power mode after a specified time interval. Additionally, the processor may be adapted to determine an operational life of the power source and generate a signal indicating the operational life of the power source. The signal may be wirelessly transmitted to at least one of the network, the central control facility, or the process transmitter.

In another general aspect, a system for fluid regulation may include a central control facility, a fluid regulator, and a fluid regulation control device. The central control facility may be adapted to wirelessly communicate fluid regulation control information. The control device may be communicably coupled to the fluid regulator and may include a processor, a fluid control assembly, a power source, and a transceiver. The processor may be adapted to generate a command for controlling the fluid regulator and to adjust a power condition of the control device. The power condition may include a low power mode and a high power mode, and the control device may consume substantially less power during the low power mode than during the high power mode. The fluid control assembly may include an electric-to-pressure transducer, which may receive a control fluid and adjust the control fluid in response to the command from the processor during the high power mode. The fluid control assembly may be adapted to maintain the adjusted control fluid at a substantially constant value during the low power mode. The power source may be adapted to supply power to the processor and the fluid control assembly. The transceiver may be coupled to the processor and the power source and adapted to wirelessly communicate the fluid regulation control information.

In more specific aspects, the fluid control assembly may maintain the adjusted control fluid at the substantially constant value during the low power mode without receiving the command from the processor during the low power mode. The processor may be adapted to transition the device from the low power mode to the high power mode upon receipt of the fluid regulation control information and to send a command to the fluid control assembly in relation to the fluid regulation control information. The fluid control assembly may also include a valve, which may be adapted to pass the adjusted control fluid during the high power mode and maintain a value of the adjusted control fluid during the low power mode.

In certain aspects, the processor may be adapted to consume substantially less power during the low mode. The transceiver may also be adapted to consume substantially less power during the lower power mode.

In another general aspect, a process for a fluid regulation control device may include generating power within the control device, adjusting a power condition of the control device, the power condition having a low power mode and a high power mode, the control device consuming substantially less power in the low power mode than in the high power mode, and generating a command signal for a fluid control assembly of the control device. The process may also include receiving a control fluid, adjusting the control fluid with the fluid control assembly in response to the command during the high power mode to generate a control signal for a fluid regulator, and maintaining the fluid regulator control signal at a substantially constant value with the fluid control assembly during the low power mode.

In more specific aspects, maintaining the fluid regulator control signal at a substantially constant value with the fluid control assembly during the low power mode includes maintaining the fluid regulator control signal at a substantially constant value without the fluid control assembly receiving the command signal.

In certain aspects, the process may include wirelessly communicating fluid regulation control information between the control device and at least one of a network, a central control facility, or a process transmitter. Transitioning the power condition of the control device from the low power mode to the high power mode may, for example, occur upon receipt of fluid regulation control information by the control device.

In some aspects, the process may include transitioning the transceiver to a lower power condition during the low power mode. The process may also include transitioning a processor of the control device to a lower power condition during the low power mode.

In particular aspects, adjusting the control fluid with the fluid control assembly in response to the command during the high power mode may include passing the adjusted control fluid through a valve of the control device during the high power mode and maintaining the fluid regulator control signal at a substantially constant value with the fluid control assembly during the low power mode without the fluid control assembly receiving the command signal may include maintaining a value of the adjusted control fluid with the valve during the low power mode.

Some aspects of the process may include conveying the adjusted control fluid from the transducer to a relay of the control device, adjusting the control fluid further by the relay, and conveying the further adjusted control fluid from the relay to the valve. Other aspects may include conveying the adjusted control fluid from the valve to a relay of the control device and adjusting the control fluid further by the relay.

Various implementations may include one or more features. For example, a fluid regulator controller may be able to operate in multiple power modes to save energy. As another example, a fluid regulator controller may be able to maintain a value of a control signal to a fluid regulator during a low power mode. As yet another example, a fluid regulator controller may be able to wirelessly transmit and receive fluid regulation control data. As a further example, a fluid regulator controller may use a battery as its power source.

These general and specific aspects may be implemented using a device, system, or method, or any combinations of devices, systems, or methods. The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Fluid regulation may be used in many different applications and may be achieved by a fluid regulator controller that controls a fluid regulator, such as a pneumatically actuated valve. The fluid regulator controller may control the fluid regulator based, in part, on wireless communications of instructions and data with the fluid regulator controller, or other appropriate device or system. The fluid regulator controller may control the fluid regulator based on the pressure, temperature, or flow rate of the regulated fluid, as well as any other appropriate fluid property. The fluid regulator controller may also use power conservation techniques to reduce its power consumption. For example, the fluid regulator controller may operate in a reduced power state while maintaining control of the fluid regulator. Fluid regulation may also be achieved by a variety of other systems and techniques.

Figure 1:
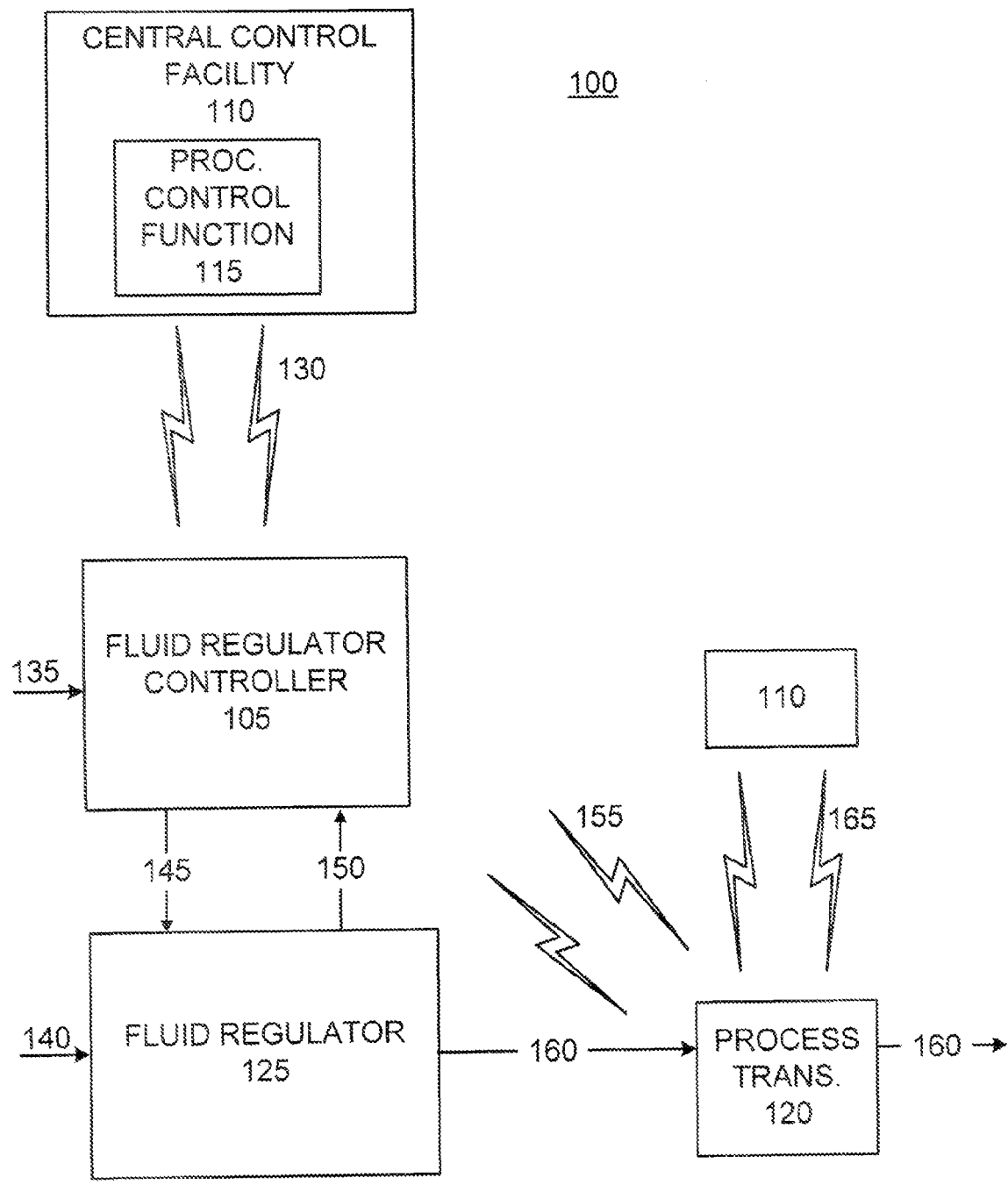
FIG. 1 is a block diagram illustrating one example of a system for controlling fluid regulation.

FIG. 1 illustrates a system 100 for controlling fluid regulation. System 100 includes a fluid regulator controller 105, a central control facility 110, a process transmitter 120, and a fluid regulator 125. In general, fluid regulator 125 receives an input process fluid 140 and adjusts the flow, or other appropriate property, of the input process fluid 140 as required to achieve an output process fluid 160. Fluid regulator 125 receives a control signal 145 from fluid regulator controller 105, which controls the regulation of input process fluid 140 by fluid regulator 125. In return, fluid regulator 125 provides a feedback signal 150 to fluid regulator controller 105. Further, fluid regulator controller 105 receives a supply fluid 135 from a remote source. Process transmitter 120 measures one or more of a variety of properties of output process fluid 160, which it may transmit to central control facility 110, fluid regulator controller 105, and/or other appropriate location. Fluid regulator controller 105 may communicate with central control facility 110 and process transmitter 120 through wireless signals 130 and 155, respectively. Additionally, process transmitter 120 may communicate to central control facility 110 through wireless signals 165.

Continuing with FIG. 1, fluid regulator 125 may be any device that operates to regulate a fluid property. For example, in some aspects, fluid regulator 125 is a process valve, which operates to regulate the flow rate of a fluid. In the illustrated implementation, for example, fluid regulator 125 may receive the input process fluid 140 at a particular flow rate. As required, fluid regulator 125 may adjust the flow rate of input process fluid 140 to achieve output process fluid 160. Thus, input process fluid 140 and output process fluid 160 may be the same fluid but at possibly distinct pressures. Further, other properties of input process fluid 140 and output process fluid 160 may be distinct. Input process fluid 140 and output process fluid 160 may be any appropriate liquid or gaseous substance, such as water, hydrocarbons, carbon dioxide, or steam, to name but a few. In some aspects, input process fluid 140 and output process fluid 160 are contained in a conduit, such as a pipe. The pipe may be constructed of steel, copper, polyvinyl chloride (PVC), or any other suitable material. In these implementations, fluid regulator 125 may be any type of process valve, as required by system 100, such as a ball valve, globe valve, butterfly valve, or other suitable valve.

Fluid regulator 125 receives control signal 145 from fluid regulator controller 105 and adjusts the position of fluid regulator 125 accordingly. In some implementations, fluid regulator 125 operates pneumatically, such that control signal 145 is a pneumatic signal. Fluid regulator 125 also provides feedback signal 150 to fluid regulator controller 105, which may, for example, provide the position of fluid regulator 125. In some implementations, feedback signal 150 is an electronic signal. However, feedback signal 150 may take any appropriate form that allows the transmission of data from fluid regulator 125 to fluid regulator controller 105, for example, the position of fluid regulator 125. For instance, feedback signal 150 may indicate that that the fluid regulator 125 is fully open, such that little change, if any, of flow rate between input process fluid 140 and output process fluid 160 occurs, or fully closed, such that output process fluid 160 has no or substantially no flow rate. Alternatively, feedback signal 150 may indicate that the fluid regulator 125 is open at a specified percentage of fully open. Feedback signal 150 may be, for example, a mechanical linkage (e.g., rotary or linear) or an electric line (e.g., an RS-232 bus). If feedback signal 150 is a mechanical linkage, fluid regulator controller 105 may use a sensor (e.g., a Hall-effect sensor) to convert the mechanical movement into an electronic signal, such as, for example, a voltage signal.

While system 100 illustrates fluid regulator controller 105 and fluid regulator 125 as physically separated, in some implementations, fluid regulator controller 105 may be mounted on or attached to fluid regulator 125. For example, fluid regulator controller 105 may be mounted on or attached to an actuator of fluid regulator 125. Fluid regulator controller 105 and fluid regulator 125 may also be coupled together in a variety of other manners.

Continuing with FIG. 1, fluid regulator controller 105 communicates with fluid regulator 125 through control signal 145 and feedback signal 150. Fluid regulator controller 105 further receives supply fluid 135. Supply fluid 135, in some implementations, is a pneumatic supply. In these implementations, supply fluid 135 may be air, natural gas, or any other suitable gaseous substance that may adjust a pneumatically operated fluid regulator. In other implementations, supply fluid 135 may be a liquid, for example, water or oil. As discussed in more detail below, fluid regulator controller 105 also contains an internal power source and may control the operation of fluid regulator 125 while managing the amount of power drawn from the internal power source. The fluid regulator controller 105 may, for example, accomplish this by operating in two or more power modes. During a lower power mode, the fluid regulator controller 105 may maintain the control signal 145 to fluid regulator 125 while drawing small amounts of power. By maintaining the control signal 145 to fluid regulator 125 during the lower power mode, a property of output process fluid 160 may be held constant or substantially constant with relatively little power consumption by fluid regulator controller 105.

Furthermore, fluid regulator controller 105 may be operable to wirelessly communicate with central control facility 110. Fluid regulator controller 105 may also wirelessly communicate with process transmitter 120. Wireless signals 130 and 155 may communicate information (e.g., instructions and/or data between) the fluid regulator controller 105 and the central control facility 110 and the process transmitter 120. Wireless signals 130 and 155, as well as 165, may be any wireless signal format, such as IEEE 802.11, Bluetooth, WiMax, or other radio frequency (RF) or infra red (IR) format. For example, signals 130, 155, and/or 165 may use digital protocol RF using frequency-hopping spread spectrum technology.

Continuing with FIG. 1, process transmitter 120 may be any device that measures a property of output process fluid 160, for example, temperature, pressure, or flow rate. Although one process transmitter 120 is shown, in some implementations, multiple process transmitters 120 may be utilized by system 100. Furthermore, one or more process transmitters 120 may be located so as to measure a property of input process fluid 140. For example, process transmitters 120 may measure the pressure of input process fluid 140 and output process fluid 160 and wirelessly transmit data representing these pressures to central control facility 110, thus allowing central control facility 110 to determine the differential pressure across fluid regulator 125. Process transmitter 120 may wirelessly communicate with central control facility 110 and fluid regulator controller 105 through wireless signals 165 and 155, respectively, utilizing an integrated wireless transceiver. Although FIG. 1 illustrates wireless two-way communication between components, such as fluid regulator controller 105, central control facility 110, and process transmitter 120, communication may also be achieved through hardwired connections, as appropriate for the particular application of system 100. Moreover, in some implementations, certain components, for example process transmitter 120, may only be capable of one-way wireless communication.

As further illustrated in FIG. 1, central control facility 110 wirelessly communicates with fluid regulator controller 105 and process transmitter 120 through wireless signals 130 and 165, respectively. Wireless signals 130 may include, for example, instructions to fluid regulator controller 105 to adjust the position of fluid regulator 125 or data from fluid regulator controller 105, including a state (e.g., position) of fluid regulator 125. Central control facility 110 may be any appropriate control room, operations center, or network that allows for the control and monitoring of fluid regulator controller 105, fluid regulator 125, and/or process transmitter 120. For example, central control facility 110 may be a stand-alone computer or server, or even a portable laptop computer, which may communicate to the components of system 100.

In some implementations, central control facility 110 includes a process control function 115. Process control function 115 may control the operation of fluid regulator controller 105 and may be any appropriate software or hardware. Additionally, process control function 115 may be an automated function, such that little or no input is required from a user or operator in order to control the operation of fluid regulator controller 105. In other implementations, however, process control function 115 may require regular input from a user or operator to maintain control of the operation of fluid regulator controller 105. While process control function 115 is illustrated as internal to central control facility 110, process control function 115 may also be located separate from central control facility 110, for example, as part of a network, computer, or server external to central control facility 110.

Although central control facility 110 is illustrated as a component of system 100, in some implementations, system 100 does not include central control facility 110. In certain implementations, process control function 115 may be internal or integral to fluid regulator controller 105, such that fluid regulator controller 105 operates as a stand-alone controller. In these implementations, process control function 115 may be remotely preprogrammed or programmed at the fluid regulator controller 105.

Figure 2:
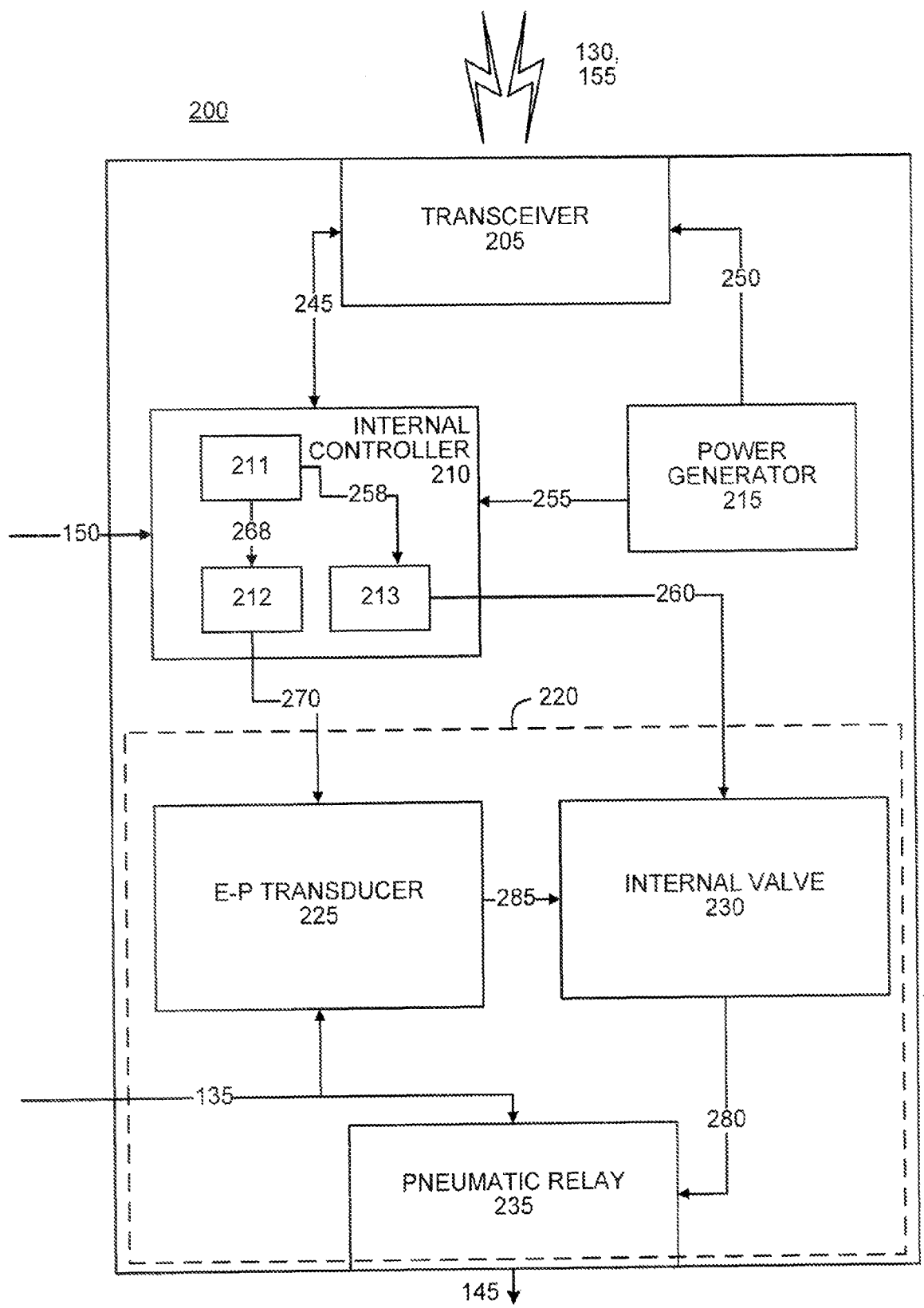
FIG. 2 is a block diagram illustrating one implementation of a fluid regulator controller for use in a system for controlling fluid regulation.

FIG. 2 illustrates one example of a fluid regulator controller 200, which may be utilized in some implementations of system 100. Fluid regulator controller 200 includes a transceiver 205, an internal controller 210, a power generator 215, and a fluid control assembly 220. As described above, fluid regulator controller 200 receives feedback signal 150 from fluid regulator 125 and supply fluid 135 and supplies control signal 145 to fluid regulator 125. Additionally, fluid regulator controller 200 may communicate wireless signals 130 and 155 to central control facility 110 and/or process transmitter 120, respectively. FIG. 2 illustrates the components of fluid regulator controller 200 as contained within a single enclosure or housing. In some implementations, however, one or more of the components may be located external to the housing of fluid regulator controller 200 and may, for example, be detachably mounted to a housing of fluid regulator controller 200.

Transceiver 205 receives electrical power from power generator 215 through power supply line 250 and is coupled to internal controller 210 through communication line 245. When powered, transceiver 205 may receive and send wireless communications with central control facility 110 and/or process transmitter 120, as well as other networks, computers, servers, handheld communication devices, and other equipment, as appropriate. In some implementations, transceiver 205 may communicate wireless signals 130 and 155 through a mesh network, which includes multiple nodes to route wireless signals to their final destinations. For instance, fluid regulator controller 200 may be coupled to a fluid regulator 125 in a large thermal generation plant employing multiple fluid regulators 125. The plant may encompass a central control facility 110 and a mesh network with various nodes strategically located around the plant. When transceiver 205 generates a wireless communication for central control facility 110 in the form of wireless signal 130, signal 130 may be routed from one node to the next, gradually traveling to central control facility 110 until it reaches facility 110. Thus, rather than requiring the generation of a wireless signal from the fluid regulator controller 105 to central control facility 110, transceiver 205 may require less power to generate a wireless signal 130 that travels the node-to-node distances.

Signals 130 and 155 may include, for example, information regarding a state of fluid regulator 125, the power mode of fluid regulator controller 200, properties of output process fluid 160 measured by process transmitter 120, and/or the remaining operational life of power generator 215. Some or all of the information transmitted by transceiver 205 through wireless signals 130 and 155 may be generated by or stored in internal controller 210. Through communication line 245, transceiver 205 receives the information from internal controller 210 and supplies internal controller 210 with information from, for example, central control facility 110 and process transmitter 120, which arrives in the form of wireless signals 130 and 155, respectively.

Continuing with FIG. 2, internal controller 210 includes a processor 211, a signal converter 212, and a valve signaling device 213. Moreover, internal controller 210 receives electrical power from power generator 215 through power supply line 255; receives feedback signal 150 from fluid regulator 125; communicates with transceiver 205 through communication line 245; and supplies fluid control assembly 220 with valve control signal 260 and transducer control signal 270. In some implementations, internal controller 210 may be a printed circuit board (PCB), including processor 211, signal circuit 212, valve signaling device 213, as well as other components such as, for example, memory, e.g., RAM, ROM, flash memory, or other appropriate form of information storage device. Moreover, internal controller 210 may be located internal to fluid regulator controller 200, as shown in FIG. 2, or external to fluid regulator controller 200 such as, for example, detachably mounted to fluid regulator controller 200.

Processor 211, in some implementations, may be a microprocessor communicably coupled to various components on internal controller 210. However, processor 211 may generally be any device for manipulating information in a logical manner. Generally, processor 211 may control the operation of fluid regulator controller 200 according to instructions stored in memory. In certain implementations, these instructions may include part or all of process control function 115. In some implementations, processor 211 may receive data from process transmitter 120 through wireless signals 155, such as, for example, temperature, pressure, or flow rate information. Upon receipt of such data, process control function 115 analyzes the data to determine the required state (e.g., position) of fluid regulator 125. Processor 211 then supplies processor signals 258 and 268 to valve signaling device 213 and signal circuit 212, respectively. Processor signal 258 may be an electrical signal to valve signaling device 213 such as, for example a current or voltage signal. Processor signal 268 may be an electronic signal to signal circuit 212, for example, a digital signal.

Signal circuit 212 receives processor signal 268 and supplies the fluid control assembly 220 with transducer control signal 270. In some implementations, signal circuit 212 may include a digital-to-analog converter, such that circuit 212 receives a digital processor signal 268 and transmits an analog transducer control signal 270 to fluid control assembly 220.

Valve signaling device 213 receives processor signal 258 from processor 211 and conveys valve control signal 260 to internal valve 230. In certain implementations, valve signaling device 213 may be a transistor. However, valve signaling device 213 may generally be any solid-state device that is operable to convey an electrical signal to fluid control assembly 220.

Continuing with FIG. 2, power generator 215 supplies power, such as electrical power, to transceiver 205 and internal controller 210. Power generator 215 may, for example, be a stand alone power source, such as a battery. In some implementations, power generator 215 is a lithium battery. Other types of electrochemical devices, such as alkaline batteries, galvanic cells, fuel cells, or flow cells may be utilized in other implementations.

In some implementations, internal controller 210 operates to control a power condition of the fluid control regulator 200. The power condition may include two or more power modes. For example, during a high power mode, internal controller 210 may send communications to and receive communications from transceiver 205 and send valve control signal 260 and transducer control signal 270 to fluid control assembly 220, and during a low power mode, internal controller 210 may require less or substantially less (e.g., 10 times or 100 times less) power from power generator 215. In certain implementations, for example, when internal controller 210 is in a low power mode, it may receive information through wireless signals 130 and 155, as well as feedback signal 150, but may not send information to transceiver 205 or transmit valve and transducer control signals 260 and 270, respectively, to fluid control assembly 220. In other implementations, the internal controller 210 may operate in an ultra-low power mode, such that internal controller 210 does not send or receive any information, for example, information contained in wireless signals 130 and 155 through communication line 245 or information from fluid regulator 125 through feedback signal 150. In these implementations, internal controller 210 may, for example, only require power to maintain a clock operation.

During a high power mode, the transceiver 205 may be operable to both transmit and receive wireless signals 130 and 155 between central control facility 110 and process transmitter 120, respectively. However, in some implementations, transceiver 205 may draw zero or substantially zero power from power generator 215 during the operation of fluid regulator controller 200 in the high power mode, thus reducing the overall power draw on power generator 215 during the high power mode. In a low power mode, transceiver 205 may only receive wireless signals 130 and 155, thus requiring less power from power generator 215. In certain implementations, transceiver 205 may receive substantially no wireless signals 130 and 155 during a low power mode.

Fluid control assembly 220 includes an electric-to-pressure transducer (or transducer) 225, an internal valve 230, and a pneumatic relay 235. In general, fluid control assembly 220 is operable to adjust control signal 145 during a high power mode in response to valve and transducer control signals 260 and 270, respectively, and further, to maintain a constant or substantially constant control signal 145 during a low power mode without receipt of transducer control signal 270. In certain implementations, fluid control assembly 220 may not include pneumatic relay 235.

Transducer 225 receives supply fluid 135 and transducer control signal 270 and supplies a transducer output 285 to internal valve 230. In some implementations, supply fluid 135 may be a gaseous material, such as air. In these implementations, transducer output 285 is a pneumatic output. Transducer control signal 270 may be an electric signal, such as, for example, a current signal. In some implementations, transducer 225 may be a current-to-pressure transducer such that transducer 225 receives a current signal (e.g., 1-2 mA) and outputs a pneumatic signal relative to the current signal. In other implementations, transducer 225 may be a voltage-to-pressure transducer, such that transducer 225 receives a voltage signal, (e.g., 1-2 volts) and outputs a pressure signal relative to the voltage signal.

In certain implementations, transducer 225 may include a nozzle into which supply fluid 135 is fed through a small orifice. The output of transducer 225 may be the nozzle back pressure. The transducer may also include a coil into which transducer control signal 270 is introduced. As the energy in the coil is increased, the magnetic flux increases, and a magnetic flapper is moved toward the nozzle, increasing nozzle back pressure. As the energy in the coil is decreased, the magnetic flux decreases, and the flapper moves away from the nozzle, decreasing nozzle back pressure. Thus, the transducer 225 may increase and decrease the pressure of transducer output 285 in correlation with the transducer control signal 270.

Continuing with FIG. 2, internal valve 230 receives power from the processor 211 through the valve signaling device 213. Additionally, internal valve 230 receives transducer output 285 and supplies pneumatic relay 235 with an internal valve output 280. Internal valve output 280 may be supplied to a signal chamber of pneumatic relay 235. Generally, internal valve 230 may be open during a high power mode, with power supplied to the internal valve 230 by processor 211 through valve signaling device 213, allowing the valve 230 to act as a pass through device, so that transducer output 285 may be conveyed to pneumatic relay 235 as internal valve output 280. During a low power mode, however, valve signaling device 213 may act as an open circuit, effectively preventing power to be conveyed from processor 211 to internal valve 230, thus closing the internal valve 230 and maintaining a constant value of internal valve output 280 to pneumatic relay 235. In some implementations, internal valve 230 is a piezoelectric valve that is closed when de-energized. In these implementations, internal valve 230 may utilize a piezoelectric bender to maintain internal valve 230 in an open position with very low power consumption, for example, hundredths of a milliwatt. Furthermore, in certain implementations, internal valve 230 receives transducer output 285 as a pneumatic signal and supplies pneumatic relay 235 with internal valve output 280 as a pneumatic signal.

In other implementations, internal valve 230 may be a solenoid valve, which is closed when de-energized and operates in a substantially similar fashion to the piezoelectric valve described above, although with some differences. As a solenoid valve, internal valve 230 may maintain an open position during the high power mode, thus allowing transducer output 285 to pass through internal valve 230. This power draw may be, however, greater than the power draw required to maintain internal valve 230, as a piezoelectric valve, in an open position. But as with implementations utilizing a piezoelectric valve for internal valve 230, the solenoid valve may also maintain a constant pneumatic signal to the signal chamber of pneumatic relay 235 during the low power mode by closing, thus maintaining a constant pressure signal to pneumatic relay 235. Internal valve 230 may generally be any appropriate device that is operable to maintain a constant pneumatic signal as internal valve output 280 while receiving zero or substantially zero power from processor 211.

Continuing with FIG. 2, pneumatic relay 235 is operable to receive internal valve output 280 and supply fluid 135, and further, to supply control signal 145 to fluid regulator 125. The operation of pneumatic relay 235 may be substantially similar during both the high and low power modes. Supply fluid 135, internal valve output 280, and control signal 145 may be any appropriate gaseous material, for example air, natural gas, or nitrogen. Thus, pneumatic relay 235 may deliver a pneumatic signal to fluid regulator 125 to adjust fluid regulator 125 in the high power mode and also maintain a pneumatic signal to fluid regulator 125 in the low power mode at a constant or substantially constant pressure. Pneumatic relay 235 may, generally, be any device that can adjust supply fluid 135 based on internal valve output 280.

The operation of the fluid regulator controller 200 within system 100 may be as follows. For example, process transmitter 120 may be a flow meter that measures the flow rate of output process fluid 160. In other implementations, process transmitter 120 may measure a temperature or pressure of output process fluid 160, or even an intrinsic property of fluid 160, for example, a concentration of a particular substance or material within output process fluid 160. Continuing the example, process transmitter 120 transmits this flow rate to fluid regulator controller 200 through wireless signal 155. Internal controller 210 receives the flow rate from transceiver 205 through communication line 245, and processor 210 executes the process control function 115 to compare the flow rate to a preprogrammed set point. Should the flow rate deviate from the preprogrammed set point such that a change of fluid regulator 125 state (e.g., position) is required, processor 211 may supply a digital signal 268, determined by the process control function 115, to signal circuit 212. Processor 211 also supplies processor signal 258 to valve signaling device 213 so that power is conveyed to internal valve 230 through valve control signal 260, thus opening the internal valve 230. Signal circuit 212 receives the digital processor signal 268 and converts it to an analog transducer control signal 270 to control transducer 225. Upon receiving transducer control signal 270, transducer 225 may adjust supply fluid 135 based on the signal 270. The adjusted supply fluid is conveyed to internal valve 230 as transducer output 285, which, subsequently, passes through the open internal valve 230 and into the signal chamber of pneumatic relay 235 as internal valve output 280. Pneumatic relay 235 receives the internal valve output 280 and adjusts supply fluid 135 based on the valve output 280. The adjusted supply fluid 135 may be conveyed as control signal 145 to fluid regulator 125, thereby adjusting a state (e.g., position) of the fluid regulator 125.

Fluid regulator controller 200 may also transition to a low power mode, for example, after a state (e.g., position) of fluid regulator 125 has been adjusted. For example, internal controller 210 receives a feedback signal 150 from the fluid regulator 125 confirming the adjusted state of the regulator 125. Processor 211 supplies no or substantially no processor signal 258 to valve signaling device 213. Valve control signal 260 from valve signaling device 213 to internal valve 230 may then be zero or substantially zero, thus closing valve 230 and maintaining a constant or substantially constant valve output 280, e.g., pressure, to the signal chamber of pneumatic relay 235. Processor 211 also supplies no or substantially no processor signal 268 to signal circuit 212. In turn, internal controller output 270 may be zero or substantially zero to transducer 225, such that transducer output 285 may be zero or substantially zero. As internal valve 230 is closed, it no longer acts as a pass through for transducer output 285. Pneumatic relay 235 operates substantially similarly in the low power mode as in the high power mode, receiving supply fluid 135 and internal valve output 280 and conveying the adjusted supply fluid 135 as control signal 145 to fluid regulator 125. Thus, as internal valve output 280 may be constant or substantially constant, control signal 145 is maintained constant or substantially constant.

In implementations where process control function 115 is included in central control facility 110, internal controller 210 may receive an instruction through transceiver 205 from central control facility 110 to adjust fluid regulator 125 to a specific state. Internal controller 210 may then determine an adjustment for fluid regulator 125 and supply fluid control assembly 220 with valve and transducer control signals 260 and 270, respectively, so that fluid control assembly 220 may supply control signal 145 to fluid regulator 125 to achieve the required state (e.g., position), as described above.

Fluid regulator controller 200 may transition from the low power mode to the high power mode for a variety of reasons. For example, fluid regulator controller 200 may switch from the low power mode to the high power mode at adjustable, preprogrammed time intervals, e.g., every one, five, or ten seconds. As another example, fluid regulator controller 200 may switch from the low power mode to the high power mode upon receipt of an appropriate signal from the central control facility 110. The appropriate signal may be, for example, a signal instructing the fluid regulator controller 200 to switch to the high power mode. Further, the signal may be a signal instructing controller 200 to adjust fluid regulator 125 to a new state (e.g., position). As yet another example, fluid regulator controller 200 may receive a measurement value, for example, a pressure, a temperature, or a flow rate value, from process transmitter 120, the magnitude of which requires an adjustment of the fluid regulator 125 by fluid regulator controller 125. As an additional example, fluid regulator controller 200 may receive an indication of a current state of fluid regulator 125, for example its current position, which requires an adjustment of fluid regulator 125 by fluid regulator controller 200, because, for instance, the current state of fluid regulator 125 varies from a required state of fluid regulator 125 by more than a threshold amount.

Fluid regulator controller 200 may also transition from the high power mode to the low power mode for a variety of reasons. For example, fluid regulator controller 200 may receive a signal from central control facility 110 to switch from the high power to low power mode. As another example, fluid regulator controller 200 may switch from the high power to low power mode after adjusting fluid regulator 125 to a new state (e.g., position) and, possibly, receiving confirmation of the new state from fluid regulator 125. As yet another example, fluid regulator controller 200 may switch from the high power to low power mode after an adjustable, preprogrammed time interval, e.g., one, five, or ten seconds.

Fluid regulator controller 200 has a variety of features. For example, fluid regulator controller 200 may maintain a value of control signal 145 constant or substantially constant to fluid regulator 125 during a low power mode, thus conserving a power supply of the fluid regulator controller 200. Moreover, fluid regulator controller 200 may conserve power by operating in a high power mode for relatively short time intervals, for example one, five, or ten seconds. This may allow fluid regulator controller 200 to use a battery for power generator 215 for an extended time period, such as six months, one year, or two years. For instance, power generator 215 may be a lithium battery. A typical lithium battery with a nominal cell voltage of 3.6 volts may have an 8.5 ampere-hours rating (capacity). Should fluid regulator controller 200 utilize a lithium battery such as this for power generator 215, the life of the lithium battery may depend on the operation of internal controller 210. For example, if internal controller 210 maintains fluid regulator controller 200 in the high power mode constantly, the life of power generator 215 may be approximately four months. However, should internal controller 210 maintain fluid regulator controller 200 in the low power mode for 90% of operation, the operational life of power generator 215 may be increased to approximately thirty-eight months. Alternatively, should internal controller 210 maintain fluid regulator controller 200 in the low power mode for roughly 93.5% of operation, power generator 215 life may increase to approximately sixty months. Furthermore, fluid regulator controller 200 may wirelessly transmit and receive data and/or instructions regarding fluid regulation with a central control facility or other appropriate location.

Figure 3:
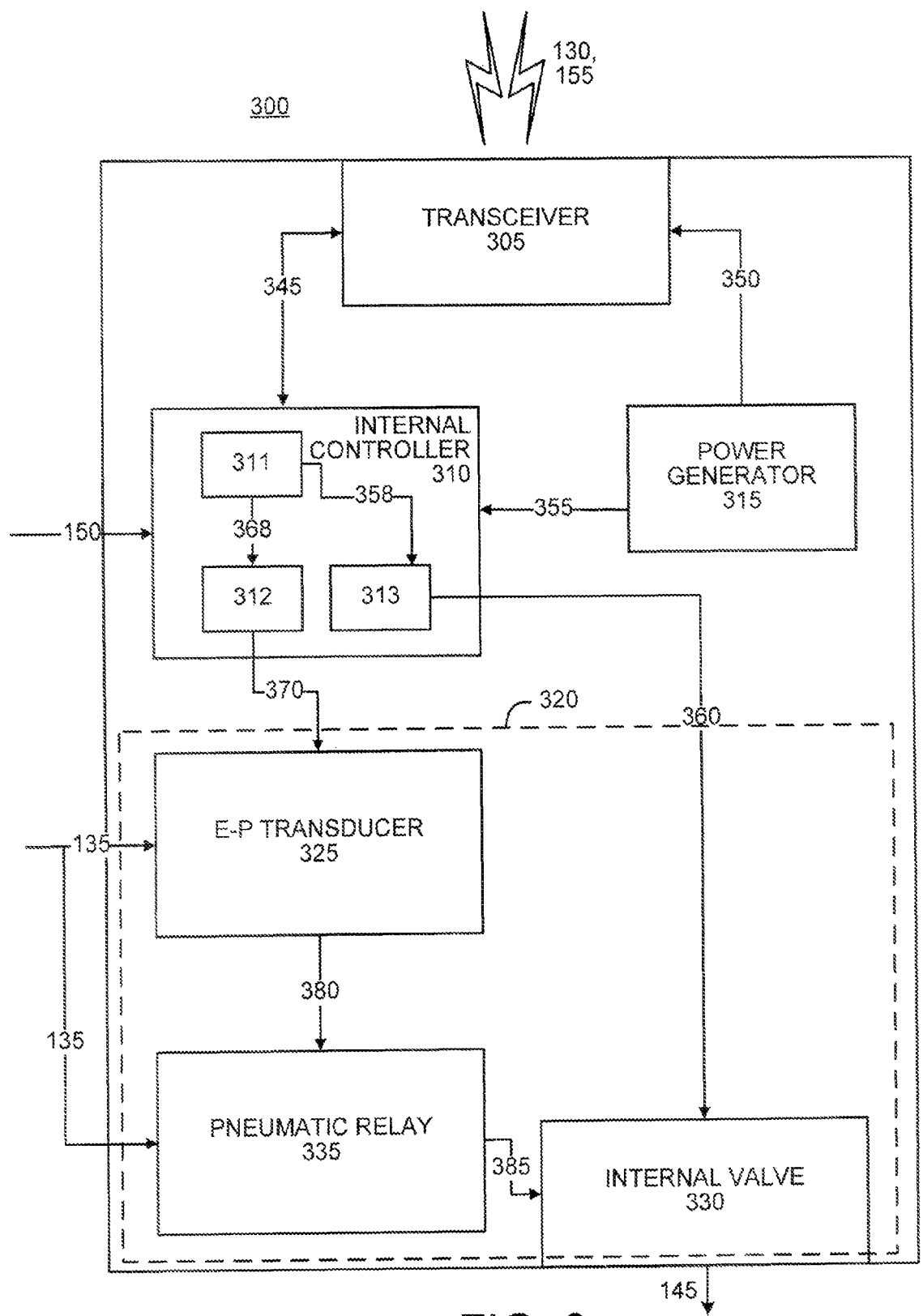
FIG. 3 is a block diagram illustrating a second implementation of a fluid regulator controller for use in a system for controlling fluid regulation.

FIG. 3 illustrates another example of a fluid regulator controller 300, which may be utilized in some implementations of system 100. Fluid regulator controller 300 includes a transceiver 305, a internal controller 310, a power generator 315, and a fluid control assembly 320. The general operation and configuration of transceiver 305, internal controller 310, and power generator 315 may be substantially similar to corresponding components found in fluid regulator controller 200, illustrated in FIG. 2. However, the operation and configuration of fluid control assembly 320 differs from that of fluid control assembly 220.

Fluid control assembly 320 includes an electric-to-pressure transducer (or transducer) 325, an internal valve 330, and a pneumatic relay 335. In certain implementations, fluid control assembly 320 may not include pneumatic relay 335. As illustrated in FIG. 3, fluid control assembly 320 receives valve control signal 360 and transducer control 370 from internal controller 310 and also receives supply fluid 135 from a source external to fluid regulator controller 300. Further, fluid control assembly 320 supplies control signal 145 to fluid regulator 125 to adjust a state (e.g., position) of fluid regulator 125 as required. Although the configuration and operation of fluid control assembly 320 differs from that of fluid control assembly 220, the general functionality remains substantially similar. Fluid control assembly 320 may be controlled by internal controller 310 to supply control signal 145 to fluid regulator 125 during a high power mode. Additionally, fluid control assembly 320 maintains a constant or substantially constant value of the control signal 145 to fluid regulator 125 during the low power mode without signal, instruction, or control from internal controller 310.

Continuing with FIG. 3, transducer 325 receives transducer control signal 370 from internal controller 310 and supply fluid 135 from a source exterior to fluid regulator controller 300. Transducer control signal 370, in some implementations, is an electrical signal, for example, an analog current signal. In these implementations, transducer 325 is a current-to-pressure transducer. In other implementations, transducer 325 may be a voltage-to-pressure transducer and receive a voltage signal as transducer control signal 370.

Pneumatic relay 335 receives supply fluid 135 and transducer output 380 and supplies relay output 385 to internal valve 330. During a high power mode, pneumatic relay 335 may adjust supply fluid 135 relative to transducer output 380, which is supplied to the signal chamber of pneumatic relay 335. The adjusted supply fluid 135 is supplied to internal valve 330 as relay output 385. Pneumatic relay 335 receives the supply fluid 135 and transducer output 380, which is supply fluid 135 at an adjusted pressure. As described above, supply fluid 135 is received and adjusted by transducer 325 relative to transducer control signal 370 to produce transducer output 380. Thus, both transducer 325 and pneumatic relay 335 receive supply fluid 135 and adjust the pressure of supply fluid 135 as it passes through each component during a high power mode.

Internal valve 330 receives power from processor 311 through valve signaling device 313. During a high power mode, internal valve 330 receives power through valve control signal 360 and may be fully or substantially open. Additionally, internal valve 330 receives relay output 385 that, during the high power mode, is passed through the open internal valve 330 to fluid regulator 125 as control signal 145. During a low power mode, internal valve 330 closes as no or substantially no power is supplied to it through valve signaling device 313. When closed, internal valve 330 maintains control signal 145 to fluid regulator 125 at a constant or substantially constant value. In some implementations, internal valve 330 is a piezoelectric valve, which closes when supplied with no or substantially no power from the processor 311. In other implementations, internal valve 330 is a solenoid valve that closes when de-energized. Although internal valve 330 may be similar to internal valve 230, internal valve 330 may be larger to accommodate the greater pressure and flow required of control signal 145 to adjust fluid regulator 125. The power consumption of internal valve 330 may increase as its size increases.

The operation of fluid regulator controller 300 may be similar to that of fluid regulator controller 200. During a high power mode, processor 311 supplies a digital processor signal 368, determined by, for example, a process control function 115, to signal circuit 312. Processor 311 also supplies processor signal 358 to valve signaling device 313 so that power is conveyed to internal valve 330 through valve control signal 360, thus opening the internal valve 330. Signal circuit 312 receives the digital processor signal 368 and may convert it to an analog transducer control signal 370 to supply to transducer 325. Upon receiving transducer control signal 370, transducer 325 adjusts supply fluid 135 based on the signal 370. The adjusted supply fluid is then conveyed to pneumatic relay 335 as transducer output 380. Pneumatic relay 335 receives the transducer output 380 and adjusts supply fluid 135 based on the output 380. The adjusted supply fluid 135 is conveyed to internal valve 330 as pneumatic relay output 385. Internal valve 330 may be fully or substantially open when powered during the high power mode, thus allowing pneumatic relay output 385 to pass through to fluid regulator 125 as control signal 145, thereby adjusting a state (e.g., position) of the fluid regulator 125.

Fluid regulator controller 300 may also transition to a low power mode, for example, after a state (e.g., position) of fluid regulator 125 has been adjusted. For example, internal controller 310 may receive a feedback signal 150 from the fluid regulator 125 confirming the adjusted state of the regulator 125. Processor 311 may then supply no or substantially no processor signal 358 to valve signaling device 313. Valve control signal 360 from valve signaling device 313 to internal valve 330 is then zero or substantially zero, thus closing internal valve 330 and maintaining a constant or substantially constant control signal 145 to fluid regulator 125. Processor 311 also supplies no or substantially no processor signal 368 to signal circuit 312. In turn, transducer control signal 370 may be zero or substantially zero to transducer 325, such that the pressure of transducer output 380 may be zero or substantially zero. Further, as internal valve 330 may be closed during the low power mode, pneumatic relay output 385 does not pass through the internal valve 330.

Fluid regulator controller 300 has a variety of features. For example, fluid regulator controller may maintain a value of control signal 145 to fluid regulator 125 during a low power mode. Additionally, fluid regulator controller 300 may use a battery for power generator 315, for example, a lithium battery. Furthermore, fluid regulator controller 300 may wirelessly transmit and receive data and/or instructions regarding fluid regulation with a central control facility or other appropriate location.

Figure 4:
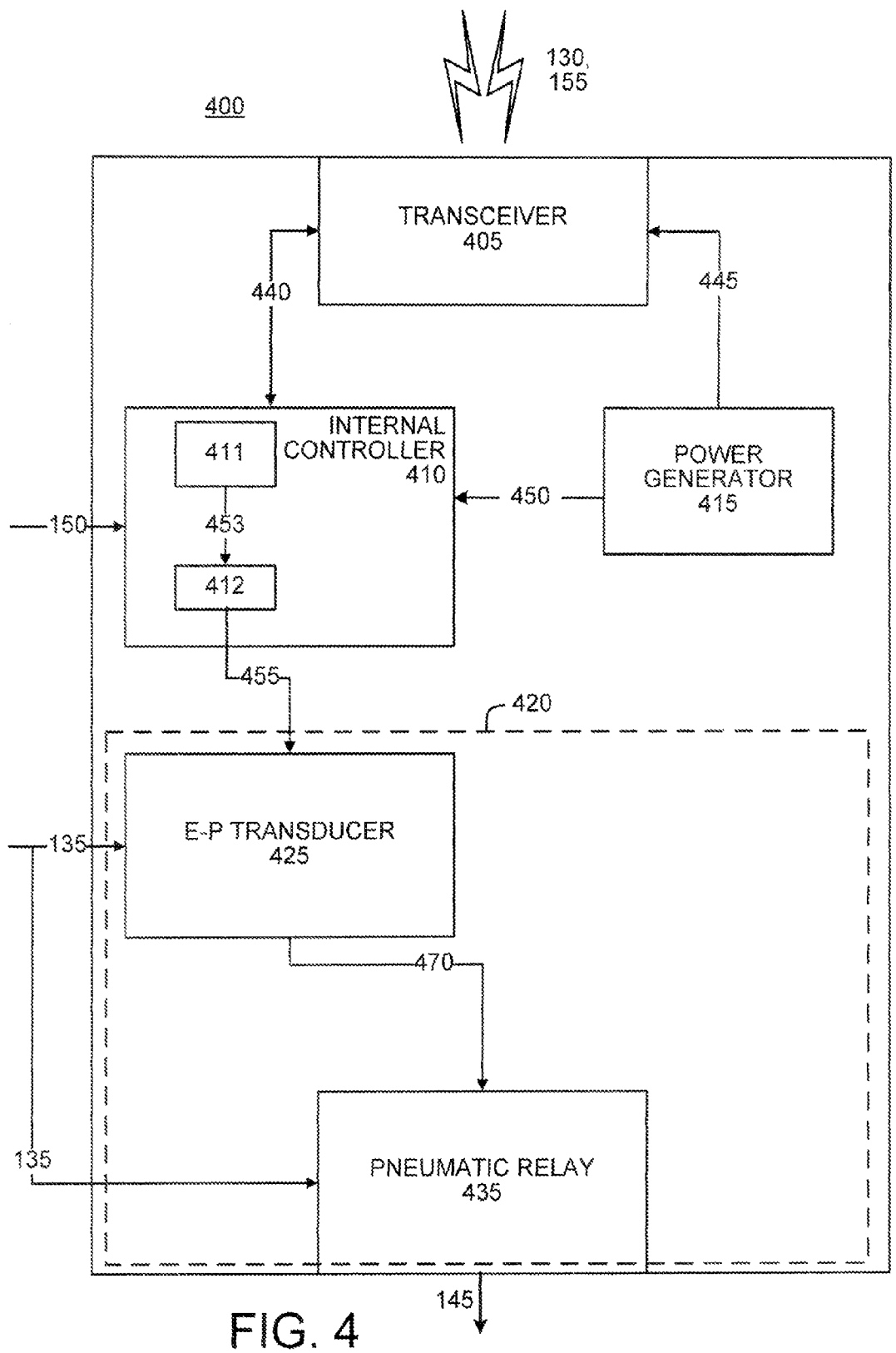
FIG. 4 is a block diagram illustrating a third implementation of a fluid regulator controller for use in a system for controlling fluid regulation.

FIG. 4 illustrates an additional example of a fluid regulator controller 400, which may be utilized in some implementations of system 100. Fluid regulator controller 400 includes a transceiver 405, an internal controller 410, a power generator 415, and a fluid control assembly 420. The general operation and configuration of transceiver 405 and power generator 415 are substantially similar to corresponding components in fluid regulator controller 200 and fluid regulator controller 300 illustrated in FIGS. 2 and 3, respectively. Moreover, the general operation of fluid control assembly 420 may be similar to fluid control assembly 220 and fluid control assembly 320. The detailed operation, components, and configuration of the internal controller 410 and fluid control assembly 420 differ, however, from that of the corresponding components in fluid regulator controllers 200 and 300.

Internal controller 410 includes processor 411 and signal circuit 412. Further, internal controller 410 receives power, e.g., electrical power, from power generator 415 through power supply line 450; receives feedback signal 150 from fluid regulator 125; communicates with transceiver 405 through communication line 440; and supplies fluid control assembly 420 with transducer control signal 455. In some implementations, internal controller 410 may be a processor circuit board, including processor 411 and signal circuit 412, as well as other components such as, for example, memory, e.g., RAM, ROM, flash memory, or other appropriate form of information storage device.

Processor 411, in some implementations, may be a microprocessor communicably coupled to various components on internal controller 410. However, processor 411 may generally be any device for manipulating information in a logical manner. Generally, processor 411 may control the operation of fluid regulator controller 400 according to instructions stored in memory. In some implementations, these instructions may include part or all of process control function 115. In some implementations, processor 411 may receive data from process transmitter 120 through wireless signals 155, such as, for example, temperature, pressure, or flow rate information. Upon receipt of such data, process control function 115 analyzes the data to determine a required state (e.g., position) of fluid regulator 125. Processor 411 then supplies processor signal 453 to signal circuit 212. Processor signal 453 may be a digital signal to signal circuit 412.

Signal circuit 412 receives processor signal 453 and supplies fluid control assembly 420 with transducer control signal 455. In some implementations, signal circuit 412 may be a digital-to-analog (DA) converter, such that signal circuit 212 receives a digital processor signal 453 and transmits an analog transducer control signal 455 to fluid control assembly 420.

Fluid control assembly 420 includes an electric-to-pressure transducer (or transducer) 425 and a pneumatic relay 435. In general, fluid control assembly 420 receives transducer control signal 455 from internal controller 410 and supply fluid 135 from a source external to fluid regulator controller 400. Further, fluid control assembly 420 supplies control signal 145 to fluid regulator 125. Fluid control assembly 420 may be controlled by internal controller 410 to supply control signal 145 to fluid regulator 125 during the high power mode. Additionally, fluid control assembly 420 may maintain a constant or substantially constant value of control signal 145 to fluid regulator 125 during the low power mode.

Continuing with FIG. 4, transducer 425 receives transducer control signal 455 from signal circuit 412 and supply fluid 135 from a source exterior to fluid regulator controller 400. Transducer control signal 455 is, in some implementations, a current signal. In these implementations, transducer 425 may be a current-to-pressure transducer. In other implementations, transducer 425 may be a voltage-to-pressure transducer and be operable to receive a voltage signal as transducer control signal 455. During the high power mode, transducer 425 adjusts supply fluid 135 based on transducer control signal 455. The adjusted supply fluid 135 is communicated from transducer 425 to pneumatic relay 435 as transducer output 470. Transducer output 470 is supplied to the signal chamber of pneumatic relay 435.

Pneumatic relay 435 is operable to receive supply fluid 135 and transducer output 470 and supply control signal 145 to fluid regulator 125. During a high power mode, pneumatic relay 435 adjusts supply fluid 135 relative to transducer output 470, which is supplied to the signal chamber of pneumatic relay 435. The adjusted supply fluid 135 is supplied as control signal 145 to fluid regulator 125. During a low power mode, transducer output 470 may be maintained constant or substantially constant to pneumatic relay 435 because of the constant or substantially constant transducer control signal 455 to transducer 425. Thus, pneumatic relay 435 maintains a constant or substantially constant value control signal 145 to fluid regulator 125 during the low power mode. In certain implementations, controller 400 does not include relay 435.

The operation of fluid regulator controller 400 may be as follows. During a high power mode, processor 411 supplies a digital processor signal 453, determined by, for example, a process control function 115, to signal circuit 412. Signal circuit 412 converts the processor signal 453 to an analog transducer control signal 455. Transducer 425 adjusts supply fluid 135 based on the transducer control signal 455, and the adjusted supply fluid is conveyed to pneumatic relay 435 as transducer output 470. Pneumatic relay 435 receives the supply fluid 135 and adjusts it based on transducer output 470. The adjusted supply fluid is then conveyed to the fluid regulator 125 as control signal 145.

Fluid regulator controller 400 may also transition to a low power mode, for example, after a state (e.g., position) of fluid regulator 125 has been adjusted. During the low power mode, processor 411 maintains a constant or substantially constant processor signal 453 to signal circuit 412, resulting in a constant or substantially constant transducer control signal 455. As a result, transducer output 470, and thus control signal 145, may be constant or substantially constant. But fluid regulator controller 400 may require less power to operate during the low power mode. Processor 411 may draw less power from power generator 415 during the low power mode by, for example, not performing certain routines (e.g., diagnostic) or communicating with transceiver 405 during this mode. Moreover, processor 211 may operate at a slower clock speed during a low power mode as compared to a high power mode. Furthermore, transceiver 405 may draw less power from power generator 415 during a low power mode by, for example, not transmitting and/or receiving wireless signals 130 and 155.

Fluid regulator controller 400 has a variety of features. For example, the manufacture and operation of fluid regulator controller 400 may be simpler than fluid regulator controllers 200 and 300. Additionally, fluid regulator controller 400 may contain fewer mechanical components than fluid regulator controllers 200 and 300. Fluid controller 400 may also maintain a constant or substantially constant value of control signal 145 to fluid regulator 125 during a low power mode. Furthermore, fluid regulator controller 400 may utilize an internal power source, for example, a lithium battery, to provide power to the components of controller 400. Fluid regulator controller 400 may also wirelessly communicate data and/or regulation control instructions with central control facility 110, process transmitter 120, or other suitable system or device.

Figure 5:
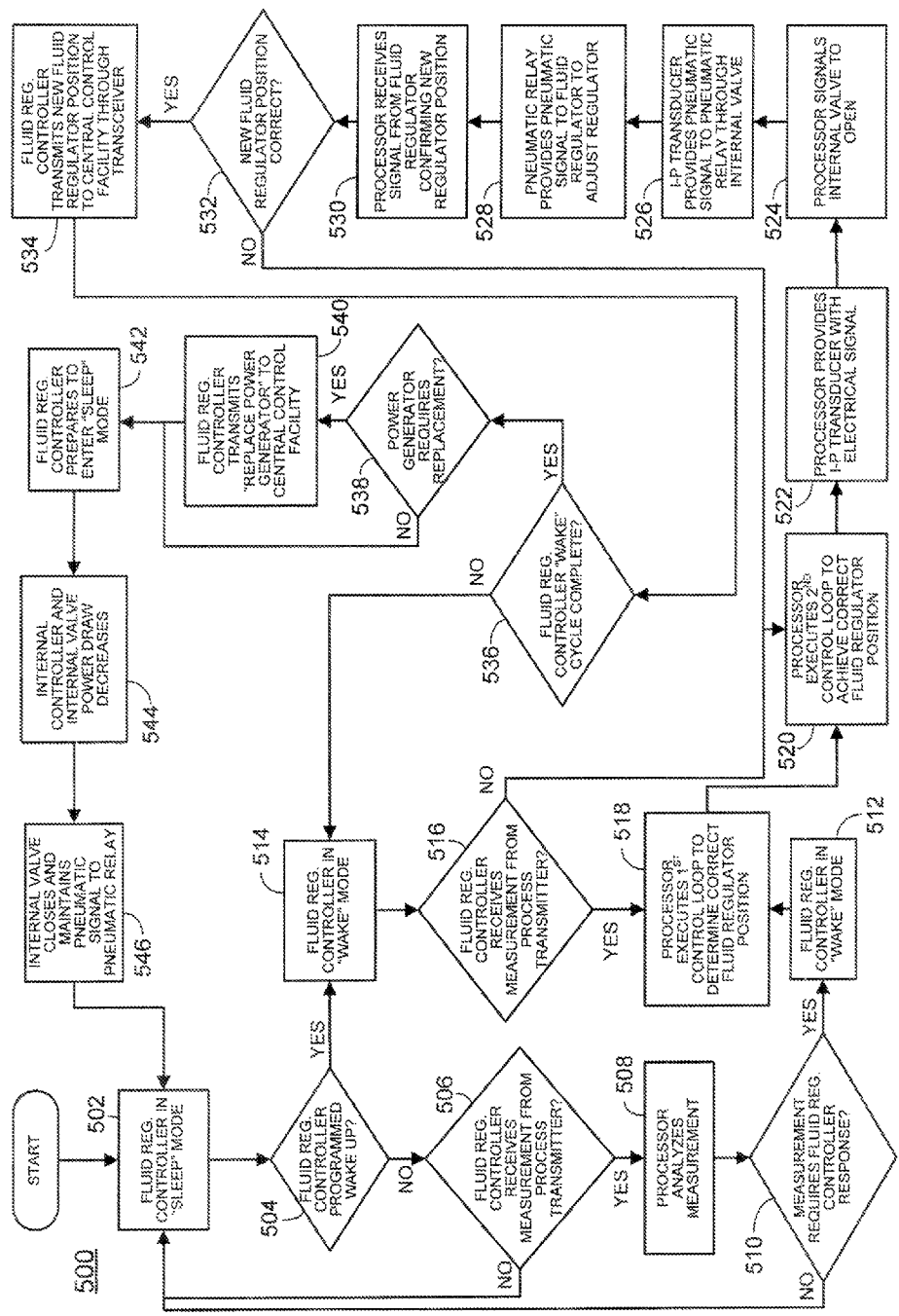
FIG. 5 is a flowchart illustrating one example of a process for controlling fluid regulation using a system for controlling fluid regulation.

FIG. 5 illustrates a process 500 for controlling fluid regulation. Process 500 may, for example, illustrate one mode of operation of fluid regulator controller 200. Process 500 may be implemented by a fluid regulator controller that includes a process control function internal to, or integrated with, the processor of the fluid regulator controller. Further, process 500 may also be implemented by a system including a central control facility, a fluid regulator controller, a fluid regulator, and a process transmitter, which may be similar to those corresponding components described in system 100.

Process 500 begins with the fluid regulator controller in "sleep" mode, e.g., a low power mode [502]. The fluid regulator controller may be programmed to switch from "sleep" mode to "wake" mode, e.g., a high power mode, at a specified time interval. If the fluid regulator controller is at a programmed "wake" time [504], fluid regulator controller automatically switches to the "wake" mode [514]. If not, the fluid regulator controller remains in "sleep" mode, but is still operable to receive a measurement signal from a process transmitter [506]. If the fluid regulator controller does not receive a measurement signal from a process transmitter during "sleep" mode, the fluid regulator controller remains in "sleep" mode [502]. As discussed above, the transceiver of the fluid regulator controller may remain operable to receive wireless signals from, for example, a process transmitter during "sleep" mode. The transceiver may, however, be unable to send any data in this mode.

If the fluid regulator controller receives a measurement signal from a process transmitter, the processor analyzes the received measurement signal [508]. The processor then determines whether the measurement signal requires a response [510]. For example, the process control function in the processor may be programmed so that only a change in a process value greater than a specified percentage requires the fluid regulator controller to switch to the "wake" mode based on the received measurement value. For instance, the process control function may be programmed such that the fluid regulator controller only switches to "wake" mode if the measurement value, for example, a pressure value from the process transmitter, requires a fluid regulator adjustment greater than 0.5% of the current fluid regulator position. Therefore, if the processor determines that the fluid regulator requires an adjustment of 0.2% as compared to the existing fluid regulator position stored in the processor memory, the fluid regulator controller may remain in "sleep" mode [502]. However, if the fluid regulator requires an adjustment from the existing fluid regulator position of, for example, 1.0%, then the fluid regulator controller switches to "wake" mode [512].

Continuing with process 500, the fluid regulator controller may enter the "wake" mode through either a programmed "wake" up [514] or through receipt of a measurement value that requires an adjustment of the fluid regulator [512]. During the "wake" mode, the fluid regulator controller may be executing, for example, programmed sampling and transmission rates. The sampling rate is the interval in which the fluid regulator controller determines the current position of the fluid regulator. This is accomplished, for example, by receiving a feedback signal from the fluid regulator and determining the current fluid regulator position relative to the feedback signal. This data, along with other data, is stored in the processor memory of the fluid regulator controller. The transmission rate is the interval in which the fluid regulator controller transmits information, such as the current fluid regulator position, to the central control facility, or other appropriate locations.

The fluid regulator controller may be programmed to remain in the "sleep" mode for one second, five seconds, ten seconds, or any other suitable time period. Thus, the fluid regulator controller may then enter the "wake" mode after the specified time interval is complete. The time interval for the "sleep" mode of the fluid regulator controller may be preprogrammed into the process control function, or alternatively, may be manually adjusted at the fluid regulator controller or adjusted by the central control facility and wirelessly transmitted to the fluid regulator controller. The percentage of time the fluid regulator controller is in "wake" mode as compared to "sleep" mode may affect, for example, the lifespan of the power generator in the fluid regulator controller, as well as the capability of the fluid regulator controller to react to required adjustments of the fluid regulator.

Once the fluid regulator controller has entered a programmed "wake" mode, it awaits a measurement value from a process transmitter [516]. If no measurement value is received within a preprogrammed, adjustable time interval, the fluid regulator controller starts an adjustment cycle of the fluid regulator [520]. This allows the fluid regulator controller to ensure that the fluid regulator position matches the last specified position. For example, the fluid regulator may experience a "drift" from the correct position through its normal operation. Thus, the fluid regulator controller may correct this "drift" by adjusting the fluid regulator even without receipt of a measurement value from a process transmitter.

If the fluid regulator controller enters the "wake" mode because of a measurement value that requires controller response [512], or if the controller has received a measurement from a process transmitter while in a programmed "wake" cycle, the controller executes a first control loop to determine the correct position of the fluid regulator relative to the received measurement value [518]. The first control loop may be, for example, a proportional-integral-derivative (PID) loop. The fluid regulator controller may be preprogrammed such that the received measurement value instigates an adjustment to the fluid regulator regardless of the degree of adjustment required, i.e., while in a programmed "wake" cycle, the processor may not analyze the received measurement value to determine if it requires a change to the fluid regulator position greater than a programmed threshold amount.

Once the fluid regulator controller has determined the required position of the fluid regulator, the controller enters the adjustment cycle [520]. The processor of the fluid regulator controller executes a second control loop to achieve the correct position of the fluid regulator [520]. The second control loop, in some implementations, is a PID control loop.

In certain implementations, before the fluid regulator controller and fluid regulator are installed in a system for fluid regulation, such as system 100, the fluid regulator controller and fluid regulator go through an auto-tuning process to establish optimized PID settings for dynamic response. This auto-tuning could allow the fluid regulator controller to adjust the fluid regulator quickly without overshooting the required position. Through the auto-tuning process, a "signature" of the fluid regulator may be saved. For instance, the relationship between a control signal to the fluid regulator and the position change of the fluid regulator may be saved in tabular or graphic form. In certain implementations, the central control facility may save this data, as well as other data, in software or other appropriate form and refer back to it throughout the operational lives of the fluid regulator controller and fluid regulator, allowing a comparison of the current fluid regulator operation to its original operation.

The processor provides the transducer, for example, a current-to-pressure transducer, an electrical signal to adjust the fluid regulator as determined by the second control loop [522]. Next, the processor signals the internal valve to open [524]. The transducer subsequently supplies the pneumatic relay with a signal that passes through the open internal valve [526]. In some implementations, the internal valve may be a normally closed piezoelectric valve. In other implementations, the internal valve may be a normally closed solenoid valve. The pneumatic relay, having received the pneumatic signal from the transducer through the internal valve into the signal chamber of the relay, supplies the fluid regulator with a control signal, such as a pneumatic control signal, which adjusts the fluid regulator [528].

Continuing with process 500, the fluid regulator controller next receives the new position of the fluid regulator through a feedback signal from the fluid regulator If the processor determines that the fluid regulator is correctly positioned [532], then the controller may wirelessly transmit the new position of the fluid regulator to the central control facility through the transceiver of the fluid regulator controller [534]. However, should the new position of the fluid regulator be incorrect [532], i.e., a position that does not match or substantially match the position as determined by the first control loop, then the fluid regulator controller returns to execute the adjustment cycle again [520].

Once the fluid regulator controller has adjusted the fluid regulator to its correct position, the fluid regulator controller determines if the "wake" cycle is complete [536]. If the "wake" cycle is not complete, the fluid regulator controller remains in "wake" mode [514]. For example, in some implementations, the fluid regulator controller may have a preprogrammed timed "wake" mode. The "wake" mode time interval may depend, for instance on the amount of adjustments recently made to the fluid regulator. However, if the "wake" cycle is complete, the fluid regulator controller prepares to enter the "sleep" mode. The processor of the fluid regulator controller first determines if the power generator requires replacement [538]. If the power generator needs replacement, e.g., the power generator is near the end of its useful life, the fluid regulator controller transmits a wireless signal through the transceiver to the central control facility indicating that the power generator needs replacement [540]. The fluid regulator controller may be programmed to indicate a need to replace the power generator when the power generator has reached a specified percentage of full capacity, for example, 10% of full capacity. In this manner, an operator responsible for replacing the power generator may have time to replace the power generator while the fluid regulator controller is still fully functional. In some implementations, the fluid regulator controller may also include a backup power generator, which may provide power to the fluid regulator controller when the power generator is being replaced or has exhausted its supply of power.

After communicating to the central control facility that the power generator requires replacing, or if determining that the power generator does not require replacing, the fluid regulator controller prepares to enter the "sleep" mode [542]. The components of the fluid regulator controller, for example the processor and transceiver, may draw less power from the power generator [544]. In "sleep" mode, the transceiver may be operable to only receive wireless communications. As the processor enters the "sleep" mode, it provides no or substantially no power to the internal valve. Without power, the internal valve closes, thus maintaining a constant pneumatic signal to the pneumatic relay [546]. Subsequently, the fluid regulator controller is in "sleep" mode [502].

Although FIG. 5 illustrates a process for fluid regulation, other fluid regulation processes may include fewer and/or a different arrangement of operations. Moreover, some steps in process 500 may be done in parallel to other steps. For example, the fluid regulator controller may only adjust the fluid regulator during a preprogrammed "wake" cycle, without entering the "wake" mode based on a received measurement signal. As another example, the fluid regulator controller may not transmit the new fluid regulator position to a central control facility, for example, if the fluid regulator controller operates as a stand-alone, preprogrammed device. Further, rather than utilizing the arrangement of the transducer, internal valve, and pneumatic relay in fluid regulator controller 200, process 500 may utilize the arrangement and operation of these components of the fluid control assembly as exemplified by fluid regulator controller 300. Additionally, rather than utilizing the components and arrangement of the transducer, internal valve, and pneumatic relay, process 500 may utilize the configuration of fluid regulator controller 400 to control fluid regulation. For example, if process 500 utilizes fluid regulator controller 400 to control fluid regulation, certain steps of process 500 may be varied and/or eliminated. For instance, as fluid regulator controller 400 may not include an internal valve, a processor of the fluid regulator controller need not signal the internal valve to open [524]. Furthermore, the transducer may provide a pneumatic signal to a pneumatic relay directly [526].

Process 500 may also include additional steps. For example, prior to executing an adjustment cycle, i.e., a second control loop to achieve a correct fluid regulator position [520], the fluid regulator controller may determine whether the adjustment cycle is required. For instance, if the fluid regulator controller does not receive a measurement from a process transmitter [516], it may receive a current position from the fluid regulator and compare the current position to a correct position of the fluid regulator, e.g., a most recent fluid regulator position received from a central control facility. If the variance between the two positions does not exceed an adjustable, preprogrammed threshold value, then the fluid regulator controller may determine if the "wake" cycle is complete [536]. If the variance does exceed the threshold value, the fluid regulator controller may begin the adjustment cycle [520].

If the fluid regulator controller does receive a measurement from a process transmitter [516] and executes a first control loop to determine a correct fluid regulator position [518], it may then receive a current position of the fluid regulator and compare the current position to the correct position of the fluid regulator. If the variance between the two positions does not exceed an adjustable, preprogrammed threshold value, then the fluid regulator controller may determine if the "wake" cycle is complete [536], otherwise it may begin the adjustment cycle [520]. Upon completion of the "wake" cycle, but prior to entering the "sleep" cycle, the fluid regulator controller may run a diagnostic routine to check the fluid regulator condition (e.g., low supply pressure). After the diagnostic routine is complete, the fluid regulator controller may transmit an alert to the central control facility as required.

Figure 6:
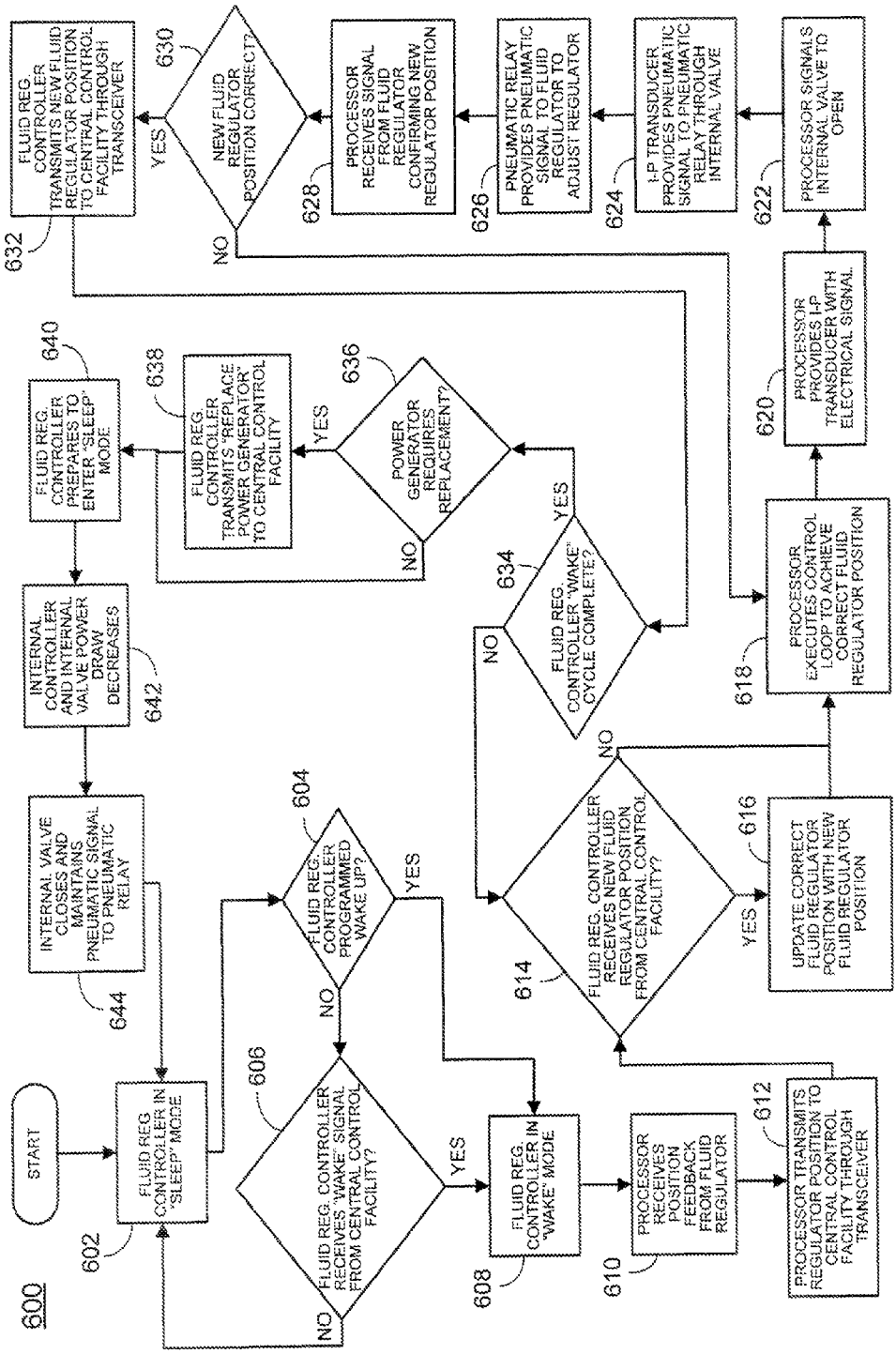
FIG. 6 is a flowchart illustrating another example of a process for controlling fluid regulation using a system for controlling fluid regulation.

FIG. 6 illustrates a process 600 for controlling fluid regulation. Process 600 may, for example, illustrate one mode of operation of fluid regulator controller 200. Process 600 may be implemented by a system including a central control facility, a fluid regulator controller, a fluid regulator, and a process transmitter, which may be similar to those in fluid regulation system 100. Furthermore, process 600 may be implemented by a fluid regulation system that includes a process control function internal to or integrated with the central control facility.

Fluid regulator controller begins in a "sleep" mode, e.g., a low power mode [602]. While in the "sleep" mode, the fluid regulator controller may switch to the "wake" mode, e.g., a high power mode, at a preprogrammed time [604]. For example, the fluid regulator controller may be programmed to remain in the "sleep" mode for one second, five seconds, ten seconds, or any other suitable time period. The percentage of time the fluid regulator controller is in "wake" mode as compared to "sleep" mode may affect, for example, the lifespan of the power generator in the fluid regulator controller, as well as the capability of the fluid regulator controller to react to required adjustments to the fluid regulator. The fluid regulator controller may then switch to the "wake" mode after the specified time interval is complete.

If the fluid regulator controller does not enter the "wake" mode at a preprogrammed time interval, the controller awaits a "wake" signal from the central control facility [606]. A transceiver of the fluid regulator controller remains operable to receive wireless signals from, for example, the central control facility during the low power mode. If the fluid regulator controller does not receive the "wake" signal from the central control facility, it remains in the "sleep" mode [602]. However, upon receiving the "wake" signal from the central control facility, the fluid regulator controller switches to the "wake" mode [608]. The processor of the fluid regulator controller receives a feedback signal from the fluid regulator that communicates to the fluid regulator controller the current position of the fluid regulator [610]. Next, the processor of the fluid regulator controller may transmit the current position of the fluid regulator to the central control facility through the transceiver [612].

Continuing with process 600, the fluid regulator controller awaits an adjustment signal from the central control facility [614], for instance, a new fluid regulator position signal. During the "wake" mode, the fluid regulator controller may be executing, for example, programmed sampling and transmission rates. The sampling rate is the interval in which the fluid regulator controller determines the current position of the fluid regulator. This is accomplished, for example, by receiving a feedback signal from the fluid regulator and determining the current fluid regulator position relative to the feedback signal. The current fluid regulator position, as well as other data, may be stored in the processor memory of the fluid regulator controller. The transmission rate is the interval in which the fluid regulator controller transmits information, such as the current fluid regulator position, to the central control facility, or other appropriate location.

If the fluid regulator controller does not receive an adjustment signal from the central control facility, the controller enters an adjustment cycle [618]. This allows the fluid regulator controller to adjust the fluid regulator to its last position specified by the central control facility, as stored in the processor memory. The fluid regulator may experience a "drift" from the correct position during its normal operation. Thus, the fluid regulator controller may correct this "drift" by adjusting the fluid regulator even without receipt of a new regulator position from the central control facility.

If the fluid regulator controller receives an adjustment signal from the central control facility then the processor updates the correct fluid regulator position stored in the processor memory with the new fluid regulator position [616]. For example, the correct fluid regulator position stored in the processor memory may be the fluid regulator position last received from the central control facility.

Continuing with process 600, the fluid regulator controller executes a control loop to achieve the correct position of the fluid regulator [618]. The control loop may be, for example, a proportional-integral-derivative (PID) loop. The processor provides the transducer, for example, a current-to-pressure transducer, an electrical signal to adjust the fluid regulator to its required position as determined by the control loop [620]. Next, the processor subsequently provides power to an internal valve, thus opening the internal valve [622]. The transducer subsequently supplies the pneumatic relay with a pneumatic signal to adjust the fluid regulator to the required position; this pneumatic signal passes through the open internal valve [624]. In some implementations, the internal valve may be a normally closed piezoelectric valve. In other implementations, the internal valve may be a normally closed solenoid valve. The pneumatic relay then provides a control signal, e.g., a pneumatic control signal to the fluid regulator to adjust the fluid regulator to the correct position [626].

The fluid regulator controller next receives the new position of the fluid regulator through the feedback signal from the fluid regulator [628]. If the processor determines that the fluid regulator is correctly positioned [630], then the controller may wirelessly transmit the new position of the fluid regulator to the central control facility through the transceiver of the fluid regulator controller [632]. However, should the new position of the fluid regulator be incorrect [630], i.e., a position that does not match or substantially match the correct fluid regulator position stored in the processor memory, then the processor begins the adjustment cycle again [618].

Once the fluid regulator controller has correctly adjusted the fluid regulator, the fluid regulator controller determines if the "wake" cycle is complete [634]. For example, in some implementations, the fluid regulator controller may have a preprogrammed timed "wake" mode. The "wake" mode time interval may depend, for instance, on the amount of adjustments recently made to the fluid regulator. For example, the fluid regulator controller may be preprogrammed such that the "wake" mode time interval is longer as the number of recent adjustments to the fluid regulator increases.

If the "wake" cycle is not complete, the fluid regulator controller remains in "wake" mode, and awaits a new fluid regulator position from the central control facility [614]. However, if the "wake" cycle is complete, the fluid regulator controller determines if the power generator requires replacement [636]. If the power generator needs replacement, e.g., the power generator is near the end of its useful life, the fluid regulator controller transmits a wireless signal through the transceiver to the central control facility indicating that the power generator needs replacement [638]. The fluid regulator controller may be programmed to indicate a need to replace the power generator when the power generator has reached a specified percentage of full capacity, for example, 10% of full capacity. In this manner, an operator responsible for replacing the power generator may have time to replace the power generator while the fluid regulator controller is still fully functional. In some implementations, the fluid regulator controller may also include a backup power generator, which may provide power to the fluid regulator controller when the power generator is being replaced or has exhausted its supply of power.

After communicating to the central control facility that the power generator requires replacing, or if determining that the power generator does not require replacing, the fluid regulator controller prepares to enter the "sleep" mode [640]. The components of the fluid regulator controller, for example, the processor and transceiver, may draw less power from the power generator [642]. In "sleep" mode, the transceiver may be operable to only receive wireless communications. As the processor enters the "sleep" mode, it provides no or substantially no power to the internal valve. Without power or with substantially no power, the internal valve closes, thus maintaining a constant pneumatic signal to the pneumatic relay [644]. Subsequently, the fluid regulator controller is in "sleep" mode [602].

Although FIG. 6 illustrates a process for fluid regulation, other fluid regulation processes may include fewer and/or a different arrangement of operations. Also, some steps in process 600 may be done in parallel to other steps. For instance, the fluid regulator controller may not transmit the new fluid regulator position to a central control facility if, for example, the fluid regulator controller operates as a stand-alone, pre-programmed device. Further, rather than utilizing the arrangement of the transducer, internal valve, and pneumatic relay in fluid regulator controller 200, process 600 may utilize the arrangement and operation of these components of the fluid control assembly as exemplified by fluid regulator controller 300.

Process 600, in some implementations, may also include other methods in which the fluid regulator controller switches from the "sleep" to the "wake" mode. For instance, rather than immediately switching to the "wake" mode upon receipt of a new regulator position signal from the central control facility, the fluid regulator controller may compare the new position signal received to the current fluid regulator position, as updated through the feedback line. If the new position signal requires an adjustment to the fluid regulator from its current position greater than a preprogrammed, adjustable threshold, then fluid regulator controller may switch from the "sleep" to the "wake" mode; otherwise, the controller may remain in the "sleep" mode.

As another example, the fluid regulator controller may switch from the "sleep" to the "wake" mode without receipt of a new position signal from the central control facility or at a preprogrammed "wake" cycle. For example, the fluid regulator controller may execute the sampling rate, i.e., receive feedback signals from the fluid regulator, at predetermined time intervals while in the "sleep" mode. If the current fluid regulator position, as indicated by the feedback signal, differs from the previous position signal received from the central control facility more than a preprogrammed, adjustable threshold, e.g., due to "drift," then the fluid regulator controller may switch to the "wake" mode to correct the variance.

Additionally, rather than utilizing the components and arrangement of the transducer, internal valve, and pneumatic relay, process 600 may utilize the configuration of fluid regulator controller 400 to control fluid regulation. For example, if process 600 utilizes fluid regulator controller 400 to control fluid regulation, certain steps of process 600 may be varied and/or eliminated. For instance, as fluid regulator controller 400 may not include an internal valve, a processor of fluid regulator controller need not provide power to the internal valve so that it may open [622]. Also, the transducer may provide a pneumatic signal to a pneumatic relay directly [624].

Process 600 may also include additional steps. For example, prior to executing an adjustment cycle, i.e., a second control loop to achieve a correct fluid regulator position [618], after the fluid regulator controller does not receive a new fluid regulator position from a central control facility [614], it may receive a current position of the fluid regulator from the fluid regulator and compare the current position to a correct position of the fluid regulator. If the variance between the two positions does not exceed an adjustable, preprogrammed threshold value, then the fluid regulator controller may determine if the "wake" cycle is complete [634]. If the variance does exceed the threshold value, the fluid regulator controller may begin the adjustment cycle [618].

If the fluid regulator controller does receive a new fluid regulator position from a central control facility [614] and updates the correct fluid regulator position with the new fluid regulator position [616], it may then receive a current position of the fluid regulator and compare the current position to the correct position of the fluid regulator. If the variance between the two positions does not exceed an adjustable, preprogrammed threshold value, then the fluid regulator controller may determine if the "wake" cycle is complete [634], otherwise it may begin the adjustment cycle [618].

A number of implementations have been described, and several others have been mentioned or suggested. Furthermore, those skilled in the art will readily recognize that a variety of additions, deletions, alterations, and substitutions may be made to these implementations while still achieving fluid regulation control. Thus, the scope of protected subject matter should be judged based on the following claims, which may capture one or more aspects of one or more implementations.

What is claimed is:

1. A device for fluid regulation control, the device comprising:
    a processor, the processor adapted to generate a command for controlling a fluid regulator and to adjust a power condition of the device, the power condition having a low power mode and a high power mode, the device consuming substantially less power during the low power mode than during the high power mode;
    a fluid control assembly, the fluid control assembly comprising an electric-to-pressure transducer, the transducer adapted to receive a control fluid and adjust the control fluid in response to the command from the processor during the high power mode, the fluid control assembly operable to maintain the adjusted control fluid at a substantially constant value during the low power mode, wherein the adjusted control fluid is conveyed as a control signal to the fluid regulator, thereby adjusting a state of the fluid regulator; and
    a power source, the power source operable to supply power to the processor and the fluid control assembly.

2. The device of claim 1 wherein the fluid control assembly is adapted to maintain the adjusted control fluid at a substantially constant value during the low power mode without receiving the command from the processor during the low power mode.

3. The device of claim 2 wherein the fluid control assembly further comprises a valve, the valve adapted to pass the adjusted control fluid during the high power mode and maintain a value of the adjusted control fluid during the low power mode.

4. The device of claim 3 wherein the fluid control assembly further comprises a relay, the relay coupled between the transducer and the valve and adapted to receive the adjusted control fluid and further adjust the control fluid before conveying it to the valve.

5. The device of claim 3 wherein the fluid control assembly further comprises a relay, the relay coupled to the valve and adapted to receive the adjusted control fluid from the valve and further adjust the control fluid.

6. The device of claim 3 wherein the valve comprises a piezoelectric valve.

7. The device of claim 1 wherein the processor is adapted to consume substantially less power during the low power mode.

8. The device of claim 7 wherein the processor is adapted to consume substantially no power during the low power mode.

9. The device of claim 1 further comprising a transceiver, the transceiver coupled to the processor and the power source and adapted to wirelessly communicate fluid regulation control information between at least one of a network, a central control facility, or a process transmitter.

10. The device of claim 9 wherein the transceiver is adapted to consume substantially less power during the low power mode than during the high power mode.

11. The device of claim 9 wherein the fluid regulation control information comprises a process transmitter measurement value, the measurement value comprising a pressure value, a temperature value, or a flow value.

12. The device of claim 9 wherein the processor is adapted to transition the device from the low power mode to the high power mode upon receipt of fluid regulation control information, the processor adapted to send a command to the fluid control assembly in relation to the fluid regulation control information.

13. The device of claim 1 wherein the control fluid comprises air.

14. The device of claim 1 wherein the power source is a battery.

15. The device of claim 14 wherein the battery is a lithium battery.

16. The device of claim 1 wherein the processor is adapted to transition the device from the low power mode to the high power mode after a specified time interval.

17. A system for fluid regulation, the system comprising:
a central control facility, the central control facility adapted to wirelessly communicate fluid regulation control information;
a fluid regulator which receives an input process fluid and adjusts the flow, or other property, of the input fluid as required to achieve an output process fluid; and
a fluid regulation control device, the control device communicably coupled to the fluid regulator and comprising:
a processor, the processor adapted to generate a command for controlling the fluid regulator and to adjust a power condition of the control device, the power condition having a low power mode and a high power mode, the control device consuming substantially less power during the low power mode than during the high power mode;
a fluid control assembly, the fluid control assembly comprising an electric-to-pressure transducer, the transducer adapted to receive a control fluid and adjust the control fluid in response to the command from the processor during the high power mode, the fluid control assembly adapted to maintain the adjusted control fluid at a substantially constant value during the low power mode;
a power source, the power source adapted to supply power to the processor and the fluid control assembly; and
a transceiver, the transceiver coupled to the processor and the power source and adapted to wirelessly communicate fluid regulation control information.

18. The system of claim 17 wherein the fluid control assembly is adapted to maintain the adjusted control fluid at a substantially constant value during the low power mode without receiving the command from the processor during the low power mode.

19. The system of claim 18 wherein the fluid control assembly further comprises a valve, the valve adapted to pass the adjusted control fluid during the high power mode and maintain a value of the adjusted control fluid during the low power mode.

20. The system of claim 17 wherein the processor is adapted to consume substantially less power during the low mode.

21. The system of claim 17 wherein the transceiver is adapted to consume substantially less power during the lower power mode.

22. The system of claim 17 wherein the processor is adapted to transition the device from the low power mode to the high power mode upon receipt of fluid regulation control information, the processor adapted to send a command to the fluid control assembly in relation to the fluid regulation control information.

23. A method for a fluid regulation control device, the method comprising:
generating power within the control device;
adjusting a power condition of the control device, the power condition having a low power mode and a high power mode, the control device consuming substantially less power in the low power mode than in the high power mode;
generating a command signal for a fluid control assembly of the control device;
receiving a control fluid;
adjusting the control fluid with the fluid control assembly in response to the command during the high power mode to generate a control signal for a fluid regulator;
conveying the control signal to the fluid regulator, thereby adjusting a state of the fluid regulator; and
maintaining the fluid regulator control signal at a substantially constant value with the fluid control assembly during the low power mode.

24. The method of claim 23 wherein maintaining the fluid regulator control signal at a substantially constant value with the fluid control assembly during the low power mode comprises maintaining the fluid regulator control signal at a substantially constant value without the fluid control assembly receiving the command signal.

25. The method of claim 24 wherein:
adjusting the control fluid with the fluid control assembly in response to the command during the high power mode comprises passing the adjusted control fluid through a valve of the control device during the high power mode; and
maintaining the fluid regulator control signal at a substantially constant value with the fluid control assembly during the low power mode without the fluid control assembly receiving the command signal comprises maintaining a value of the adjusted control fluid with the valve during the low power mode.

26. The method of claim 25 further comprising:
conveying the adjusted control fluid from the transducer to a relay of the control device;
adjusting the control fluid further by the relay; and
conveying the further adjusted control fluid from the relay to the valve.

27. The method of claim 25 further comprising:
conveying the adjusted control fluid from the valve to a relay of the control device; and
adjusting the control fluid further by the relay.

28. The method of claim 23 further comprising wirelessly communicating fluid regulation control information between the control device and at least one of a network, a central control facility, or a process transmitter using a transceiver.

29. The method of claim 28 further comprising transitioning the transceiver to a lower power condition during the low power mode.

30. The method of claim 28 further comprising transitioning the control device from the low power mode to the high power mode upon receipt of fluid regulation control information by the control device.

31. The method of claim 23 further comprising transitioning a processor of the control device to a lower power condition during the low power mode.

* * * * *

UNITED STATES PATENT AND TRADEMARK OFFICE
CERTIFICATE OF CORRECTION

PATENT NO. : 7,818,093 B2
APPLICATION NO. : 11/741681
DATED : October 19, 2010
INVENTOR(S) : Henry W. Boger It is certified that error appears in the above-identified patent and that said Letters Patent is hereby corrected as shown below:

On column 3, line 10, delete "low mode" and insert -- low power mode --, therefor.

On column 25, lines 62-63, in Claim 20, delete "low mode" and insert -- low power mode --, therefor.

Signed and Sealed this

Twenty-first Day of December, 2010

David J. Kappos
*Director of the United States Patent and Trademark Office*